United States Patent [19]

Swanstrom

[11] 4,130,138
[45] Dec. 19, 1978

[54] MOLDED STAND-OFF

[75] Inventor: Kenneth A. Swanstrom, Buckingham Township, Bucks County, Pa.

[73] Assignee: Penn Engineering & Manufacturing Corp., Danboro, Pa.

[21] Appl. No.: 802,116

[22] Filed: May 31, 1977

[51] Int. Cl.² .................... F16B 09/00; F16B 37/04
[52] U.S. Cl. .................... 138/109; 85/32.1; 403/179; 403/199; 403/200
[58] Field of Search ......... 138/109; 16/1 R, DIG. 40, 16/DIG. 41; 85/32 R, 32 WE, 32.1, 35; 403/25, 179, 192, 199, 200, 299, 332, 404

[56] References Cited

U.S. PATENT DOCUMENTS

| 1,062,635 | 5/1913 | Clements | 85/32 R |
| 3,339,953 | 9/1967 | Bohn | 85/32.1 |
| 3,512,328 | 5/1970 | Eriksson | 85/35 |

FOREIGN PATENT DOCUMENTS 1344115  10/1963  France ..................... 138/109

Primary Examiner—Richard R. Stearns
Attorney, Agent, or Firm—Joseph G. Denny, III; Peter J. Patane

[57] ABSTRACT

A self-clinching stand-off to be embedded into thin sheeted material. The stand-off comprises a base produced on a "screw machine" and an extension molded thereto. The extension is formed from a material which is softer than that of the base. Further, the extension may vary in length for a given base.

4 Claims, 4 Drawing Figures

MOLDED STAND-OFF

BACKGROUND OF THE INVENTION

This invention relates to self-clinching stand-off to be embedded into thin sheeted material. An example of a stand-off adapted to be embedded into thin sheeted material is shown in FIG. 9 of U.S. Pat. No. 3,252,742.

SUMMARY OF THE INVENTION

The object of this invention is to provide stand-offs similar to known stand-offs but which may be manufactured less expensively than known stand-offs.

It is a further object of this invention to provide stand-offs which may be recycled if it is found that stand-offs of one size have been manufactured when those of another size are required.

Presently stand-offs which are on the market that are made entirely of metal are machined on lathes commonly known as "screw machines". While in recent years, high speed screw machines have been developed and used for the manufacture of stand-offs, it is desirable to reduce the amount of the stand-off that must be produced on the screw machine and to produce the remainder of the part by a less expensive method.

Further, when the stand-off is to be embedded into thin sheeted material, the part of the stand-off which is driven into the sheeted material must be of a material which is harder than that of the sheeted material, but the remainder of the stand-off may be made of a softer and less expensive material.

It has thus been conceived to produce as a screw machine part only the base of the stand-off. The base includes a part to be driven into, i.e., clinched to, the sheeted material and also includes an integral post. A tube or extension is thereafter molded about the post to provide the desired length for the stand-off.

If it should happen that an excess of stand-offs of one length are in stock when stand-offs of another length are required to fulfill current sales orders, the stand-offs may be heated, the tube melted off, and the (machine screw) base retrieved. The so retrieved (machine screw) base could then have molded to it an extension of the then required length.

The foregoing and other objects of this invention, the principles of this invention, and the best modes in which I have contemplated applying such principles will more fully appear from the following description and accompanying drawings in illustration thereof.

BRIEF DESCRIPTION OF THE VIEWS

Figure 4:
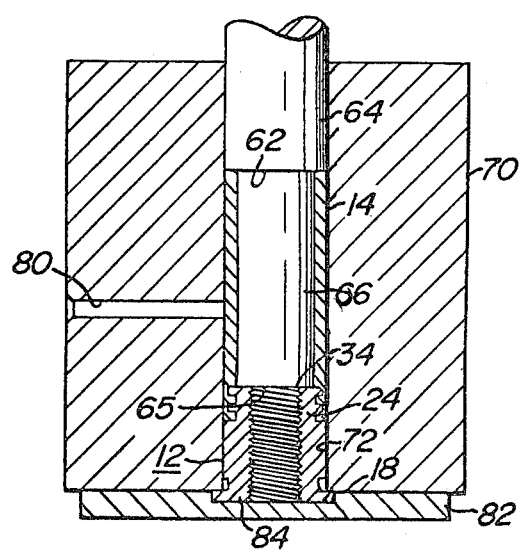

FIG. 4 diagrammatically shows apparatus for molding the tube about the base to form the stand-off.

DESCRIPTION OF THE PREFERRED EMBODIMENT

Figure 1:
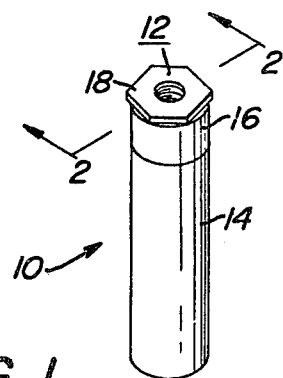
FIG. 1 is a front and top perspective view of a stand-off incorporating this invention.

Referring to the drawings, FIG. 1 illustrates a stand-off 10 including a base 12 and a tube or extension 14. The base 12, FIG. 2, includes an integral post 16 about which the tube 14 is molded.

Figure 2:
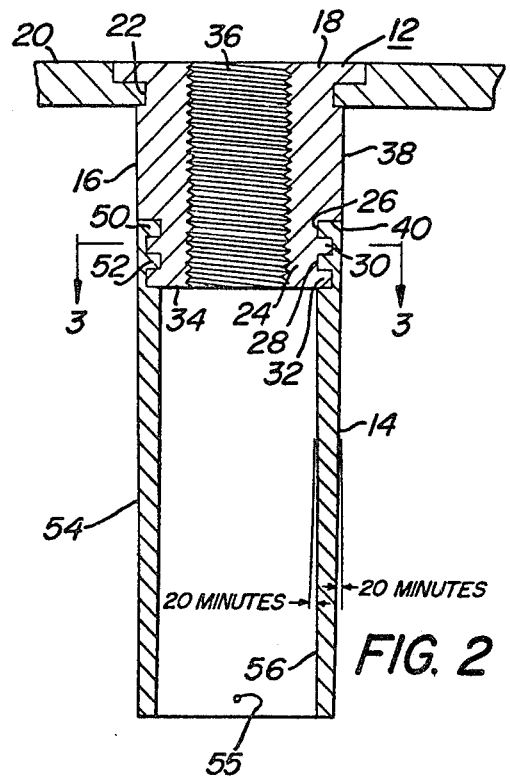
FIG. 2 is a longitudinal cross sectional view of the stand-off shown in FIG. 1 taken along the line 2—2 in FIG. 1 and showing the stand-off secured to a sheeted material.
Figure 3:
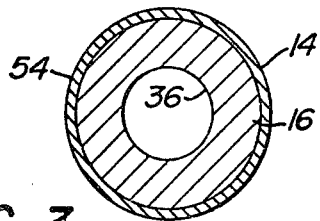
FIG. 3 is a cross-sectional view taken along the line 3—3 in FIG. 2.

The base 12 further includes a polygonal head 18, the head 18 illustrated being hexagonal, to resist rotation of the stand-off after it is embedded in a sheeted material 20, FIG. 2. The post 16 includes an undercut circular groove 22 directly below the head 18, as viewed in FIG. 2, so that the head 18 overhangs the groove 22, the post 16 and the tube 14, as shown. When the head 18 is forced into the sheeted material 20, the head 18 displaces a portion of the sheeted material 20 into the undercut groove 22, whereby the base 12 becomes secured to the sheeted material 20, as is known and illustrated in FIG. 2.

The end portion 24 of the post 16 opposite the head 18 is made of reduced diameter and includes two circular grooves 26 and 28 spaced apart by a rib 30. The end portion 24 also includes an end rib 32 defining, in part, the lower groove 28. The base 12 also includes a flat end face 34.

The base 12 has an internally threaded bore 36 throughout its length, as shown in FIG. 2. Also, the outer surface 38 of the base 12 between the grooves 22 and 26 is cylindrical. The annular end wall 40 which defines, in part, the groove 26 forms a shoulder upon which is seated the molded tube 14.

As illustrated, the molded tube 14 has mating ribs 50 and 52 which extend into and interlock with the grooves 26 and 28 and the ribs 30 and 32 of the post 16. Further, the tube 14 is formed with an outer tapered conical surface 54 which has the same diameter as cylindrical surface 38 of the post 16 at its upper end but which tapers inwardly, as shown.

Preferably the tube 14 has an opening 55 throughout its length. The tube 14 is coaxial with the base 12 and the opening 55 is in communication with the threaded bore 36. The opening 55 is defined by an inner cylindrical surface 56 of the tube 14 which has a diameter larger than the root diameter of the threads in the base 12, so that clearance is provided for a screw (not shown) which extends into and through the opening 55 of the tube 14 and into mating engagement with the threaded bore 36. The inner surface 56 tapers outwardly, as shown.

The molding apparatus, shown diagrammatically in FIG. 4, includes a block 70 with a cylindrical opening 72 into which extends the post 16 of the base 12. The head 18 is seated against the mold block 70, as shown in FIG. 4, and is supported in this position by a block 82 having a suitable recess 84 to receive the head 18. From the opposite end of the mold block 70 (the end opposite the base 12), a core pin 64 extends into the opening 72, the core pin 64 having a portion 66 of reduced diameter and a flat annular end face 65 seated upon the end face 34 of the base 12. The outer surface of the portion 66 together with its end face 65 form a sharp corner to define the inside corner at the juncture of the molded tube 14 and the end face 34. The outer surface of the portion 66 is tapered so as to produce the tapered or conical surface 56. The taper, as indicated in FIG. 2, increases along the length of the stand off. The core pin 64 is slidably received within the opening 72. The shoulder 62 together with the reduced diameter portion 66 and the wall defining the opening 72 together with the end portion 24 of the base 12 defines the tube 14.

The tube 14 is formed by injecting into the space, through an opening 80, suitable molten material, preferably a zinc alloy. The molten material is permitted to cool and harden to form the tube 14 and thereafter the base 12 and tube 14 are ejected from the mold.

Thus it is seen that the tube 14 is formed in the space defined by the end face 65 of the core pin 64, the reduced diameter portion 66, the annular wall 67 of the mold block 70, the surface 34, the end wall 40 and the surfaces defining the two grooves 26 and the two ribs 30 and 32.

As mentioned previously, the base 12 is a screw machine item and made of a material such as steel which is relatively hard. On the other hand, the tube 14 is molded from a zinc alloy or the like and is much softer relative to the base 12. The material of the tube 14 is also much less expensive than the steel of the base 12.

The tube 14 could, of course, be molded of other materials, such as plastic (non-metallic) materials.

As indicated previously, the inside wall 56 and the outside wall 54 are uniformly tapered, as shown in FIG. 2, so that the wall at the end opposite the base 12 is thinner than the wall adjacent the end face 34. This uniform taper facilitates removal of the stand-off from the mold. Assuming that the length of the base 12 is about 0.250 inches, that the largest diameter of the post 16 is about 0.280 inches and that the overall length of the stand off is about 1.125 inches, a taper angle of about 20 minutes ($\frac{1}{3}$ of a degree) has been found to be satisfying for both the surfaces 54 and 56.

Having described the invention, I claim:

1. A stand-off comprising
   a base defining a head and a cylindrical post between which is an undercut groove formed on said post, said head overhanging said post, said undercut groove receiving material displaced by said head from a sheet in which said head is to be embedded, said post having an end portion opposite said head of a smaller outer diameter than the remainder of said post, a tube bonded to said end portion of smaller diameter and of a material which is softer than the material of said base and which has a substantially lower melting point than the material of said base.

2. The combination of claim 1 wherein
   said end portion of smaller diameter has at least one undercut groove and said tube has a corresponding projection keyed to said groove.

3. The combination of claim 2 wherein said tube has a tapering wall thickness which is thinnest at the end portion of said opposite said base.

4. The combination of claim 3 wherein said tube and said post have the same outer diameter at their juncture.

* * * * *